US007490657B2

(12) United States Patent
Ueyama

(10) Patent No.: US 7,490,657 B2
(45) Date of Patent: Feb. 17, 2009

(54) DOUBLE-PIPE GEOTHERMAL WATER CIRCULATING APPARATUS

(76) Inventor: Hiroaki Ueyama, 1-7 Kita2-jyou Higashi 13-chome, Chuo-ku, Sapporo, Hokkaido (JP) 060-0032

( * ) Notice: Subject to any disclaimer, the term of this patent is extended or adjusted under 35 U.S.C. 154(b) by 0 days.

(21) Appl. No.: 11/901,776

(22) Filed: Sep. 19, 2007

(65) Prior Publication Data

US 2008/0073058 A1 Mar. 27, 2008

(30) Foreign Application Priority Data

Sep. 22, 2006 (JP) ............... 2006-257840

(51) Int. Cl.
*F24J 3/08* (2006.01)
(52) U.S. Cl. .............. 165/45; 60/641.2; 62/260
(58) Field of Classification Search ............. 165/45;
62/260; 60/241.2, 241.3, 641.2, 641.3
See application file for complete search history.

(56) References Cited

U.S. PATENT DOCUMENTS

| | | | | |
|---|---|---|---|---|
| 2,461,449 | A * | 2/1949 | Smith et al. ............. | 62/260 |
| 3,679,264 | A * | 7/1972 | Van Huisen ............. | 165/45 |
| 3,805,885 | A * | 4/1974 | Van Huisen ............. | 165/45 |
| 3,863,709 | A * | 2/1975 | Fitch .................... | 165/45 |
| 4,010,800 | A * | 3/1977 | Terry ................... | 166/258 |
| 4,019,577 | A * | 4/1977 | Fitch et al. ............. | 165/45 |
| 4,201,060 | A * | 5/1980 | Outmans ............... | 60/641.2 |
| 4,239,288 | A * | 12/1980 | Thompson et al. ...... | 299/5 |
| 4,377,208 | A * | 3/1983 | Elliott et al. ........... | 166/265 |
| 4,448,237 | A * | 5/1984 | Riley .................. | 165/45 |
| 4,507,925 | A * | 4/1985 | Schaetzle et al. ........ | 165/45 |
| 4,671,351 | A * | 6/1987 | Rappe .................. | 165/45 |
| 5,322,115 | A * | 6/1994 | Hildebrand ............. | 165/45 |
| 5,561,985 | A * | 10/1996 | Cochran ................ | 62/260 |
| 5,937,934 | A * | 8/1999 | Hildebrand ............. | 165/45 |
| 6,925,830 | B2 * | 8/2005 | Xu ..................... | 62/260 |
| 2006/0137349 | A1 * | 6/2006 | Pflanz ................. | 60/641.2 |

FOREIGN PATENT DOCUMENTS

| | | | | | |
|---|---|---|---|---|---|
| JP | | 57104051 A | * | 6/1982 | ............ 165/45 |
| JP | | 58-024762 | | 2/1983 | |
| JP | | 61186757 A | * | 8/1986 | ............ 165/45 |
| JP | | 4-8052 | | 1/1992 | |
| JP | | 2000-356433 | | 12/2000 | |
| JP | | 2001-004232 | | 1/2001 | |
| JP | | 2006-084093 | | 3/2006 | |
| WO | | WO 8503994 A1 | * | 9/1985 | ............ 165/45 |

* cited by examiner

*Primary Examiner*—Leonard R Leo
(74) *Attorney, Agent, or Firm*—William L. Androlia; H. Henry Koda

(57) ABSTRACT

A double-pipe geothermal water circulating apparatus including an outer pipe having a geothermal water supplying strainer for infiltrating geothermal water from an aquifer and a geothermal water returning strainer for returning used geothermal water to the aquifer, a thermal insulation inner pipe composed of a thermal insulator that forms a flow channel with the outer pipe, a pump for pumping the geothermal water from the thermal insulation inner pipe, a heat source supplying force feed pipe for force-feeding pumped geothermal water to an heat exchanger and a heat source reusing pipe connected to the flow channel for returning the used geothermal water to the aquifer. Also, the double-pipe geothermal water circulating apparatus is provided therein with the flow channel from the geothermal water returning strainer to the geothermal water supplying strainer that is not separated, whereby geothermal water can flow therethrough.

2 Claims, 9 Drawing Sheets

DOUBLE-PIPE GEOTHERMAL WATER CIRCULATING APPARATUS

BACKGROUND OF THE INVENTION

1. Field of the Invention

The present invention generally relates to a technology for using geothermal water in an aquifer as a heating and cooling medium for exchanging the heat, and more particularly to a double-pipe geothermal water circulating apparatus that can circulate said geothermal water by returning used geothermal water to said aquifer or an above-located aquifer for exchanging the heat.

2. Description of the Related Art

It is generally known that the underground temperature is lower and higher than the outer temperature in summer and winter, respectively and the geothermal temperature becomes high as its observed point comes deeper. In a conventional invention, by pumping underground geothermal water in an aquifer, the geothermal water is used as a cooling medium in summer and a heating medium in winter.

FIG. 7 shows a conventional type of heat exchanging system using geothermal water. In the heat exchanging system 700, a water collecting tank 710 is installed underground as deep as an aquifer A to feed the geothermal water collected in the water collecting tank 710 to an heat exchanger 750 using a pump 730. Then, used geothermal water is transported to a sewage treatment facility 780 to treat waste water and to an underground geothermal water returning well 770 to be reused underground. In fact, such an heat exchanging system can directly feed the geothermal water to the heat exchanger 750, thereby relatively reducing thermal energy loss and improving thermal efficiency.

Despite these technological advantages, the conventional type of heat exchanging system 700, as shown in FIG. 7, has a drawback of higher initial costs due to required construction of the sewage treatment facility 780 for treating the used geothermal water and the geothermal water returning well 770. Also, this system, which is not designed to return the collected geothermal water to the aquifer A, could cause serious environmental concerns such as exhaustion of water in a well and ground subsidence due to excessive water intake. Consequently, this system is not actually used in most heat exchanging operations.

In the meantime, this inventor proposed an underground geothermal water circulating apparatus that can efficiently melt snow by solving the above-mentioned problems as disclosed in the Japanese Unexamined Patent Publication No. 06-228928.

FIG. 8 is a block diagram showing a first embodiment of the underground geothermal water circulating apparatus according to claim 1 of said Japanese Unexamined Patent Publication. An underground geothermal water circulating apparatus 800 comprises a cylinder-type geothermal source collecting casing 810 filled with a medium liquid installed underground, a cylinder-type thermal insulating casing 820 at the axial core of the geothermal source collecting casing 810 and a pump 830 in the thermal insulating casing 820. Then, said pump 830 sucks said medium liquid and distributes it to a non-water spray type snow melting system 850 as a snow-melting heat source. After used medium liquid of a lower temperature is returned to the geothermal source collecting casing 810, it is heated by geothermal source via a side wall of said geothermal source collecting casing 810. Afterward, the pump 830 sucks said medium liquid into said thermal insulating casing 820 and it is repeatedly used as a snow-melting heat source.

FIG. 9 is a block diagram showing a second embodiment of the underground geothermal water circulating apparatus according to claim 2 of said Japanese Unexamined Patent Publication. An underground geothermal water circulating apparatus 900 comprises a cylinder-type geothermal source collecting casing 910 installed underground having a geothermal liquid collecting strainer 911 for collecting geothermal water from an aquifer and a snow-melted water reusing liquid returning strainer 912 placed above said geothermal liquid collecting strainer 911 for returning geothermal water used in a snow melting system 950 to an underground zone. Said geothermal source collecting casing 910 is provided with a cylinder-type thermal insulating casing 920 at the axial center thereof. A separating packer 990 is mounted on a wall between said geothermal source collecting casing 910 and said thermal insulating casing 920 for separating reused and collected geothermal liquids.

In the underground geothermal water circulating apparatus 900 of the second embodiment as described above, the geothermal liquid collecting strainer 911 collects the geothermal water to the geothermal source collecting casing 910, which will be sucked by the pump 930 to said thermal insulating casing 920 and then the snow melting system 950. Afterward, geothermal water used in the snow melting system 950 returns to the geothermal source collecting casing 910 as a reused geothermal liquid and it is discharged from the snow-melted water reusing liquid returning strainer 912 and reused in the aquifer. The separating packer 990 can prevent the mixture of the reused and collected geothermal liquids.

The underground geothermal water circulating apparatus disclosed in the above Japanese Unexamined Patent Publication is expected to provide several technological advantages, such as lower installation costs in one integrated unit, a small rate of mechanical failure due to simplified structure and no exhaustion of water in a well and ground subsidence due to excessive water intake by reusing the medium and geothermal liquids.

SUMMARY OF THE INVENTION

However, the invention of the first embodiment disclosed in the above Japanese Unexamined Patent Publication could cause the leakage of a medium liquid due to damage to the geothermal source collecting casing from corrosion and earthquake, resulting in soil contamination. Additionally, since the geothermal source collecting casing geothermally heats the medium liquid from a side wall thereof, energy loss can be significantly found, as opposed to a conventional system for directly supplying geothermal water to an heat exchanger.

Meanwhile, the second embodiment of the above Japanese Unexamined Patent Publication is unable to remove an operational problem with strainers clogged with sediment. More specifically, clogged strainers cannot collect and reuse geothermal water, resulting in the inability to collect the geothermal water or reuse it in the aquifer and to continuously use a well. Solving this problem requires an arduous work of taking out the entire apparatus and high operational costs. Subsequently, the geothermal source collecting casing and thermal insulating casing that are still under service life cannot be fully or advantageously used, and this could cause a great loss in operation.

Moreover, the geothermal source collecting casing, in which the separating packer separates the collected and reused geothermal water, is designed to discharge reused water from the geothermal water returning strainer to the aquifer. Thus, the clogging of said geothermal water returning strainer causes reused water to accumulate within the geothermal source collecting casing, thereby generating operational troubles due to liquid overflow and imbalanced flow between collected and reused geothermal water.

This invention is aimed at providing a double-pipe geothermal water circulating apparatus that can be continuously used even if a plurality of strainers in contact with an aquifer is clogged, and also cause no exhaustion of water in a well or ground subsidence by smoothly returning geothermal water collected from the aquifer.

The double-pipe geothermal water circulating apparatus according to the present invention comprises an outer pipe having a geothermal water supplying strainer that is installed as deep as said aquifer for collecting geothermal water from an aquifer and a geothermal water returning strainer for returning used geothermal water to said aquifer from above said geothermal water supplying strainer, a thermal insulation inner pipe composed of a thermal insulator inserted in said outer pipe that forms a flow channel with the outer pipe having an inlet for collecting said geothermal water adjacent to a lower end of said outer pipe, a pump for pumping said geothermal water having a suction part for sucking said geothermal water from said thermal insulation inner pipe installed below a running water level, a heat source supplying force feed pipe for force-feeding said geothermal water pumped by the pump to an heat exchanger, and a heat source reusing pipe connected to said flow channel for returning said geothermal water used in said heat exchanger to said aquifer. Moreover, the double-pipe geothermal water circulating apparatus is provided therein with said flow channel from said geothermal water returning strainer to said geothermal water supplying strainer that is not separated, whereby geothermal water can flow therethrough, and with said inlet for collecting geothermal water, by mixing geothermal water infiltrated from said geothermal water supplying strainer with part of geothermal water used in said heat exchanger.

Additionally in this invention, water supplying and distributing means is preferably mounted on said heat source supplying force feed pipe to use the geothermal water as a water source as well as a heat source.

According to the present invention, this apparatus can be continuously used even if a plurality of strainers in contact with an aquifer is clogged, and also cause no exhaustion of water in a well or ground subsidence by smoothly returning geothermal water collected from the aquifer.

BRIEF DESCRIPTION OF THE DRAWINGS

The above and other objects of the invention will be seen by reference to the description taken in connection with the accompanying drawings, in which.

DETAILED DESCRIPTION OF THE PREFERRED EMBODIMENT

Figure 1:
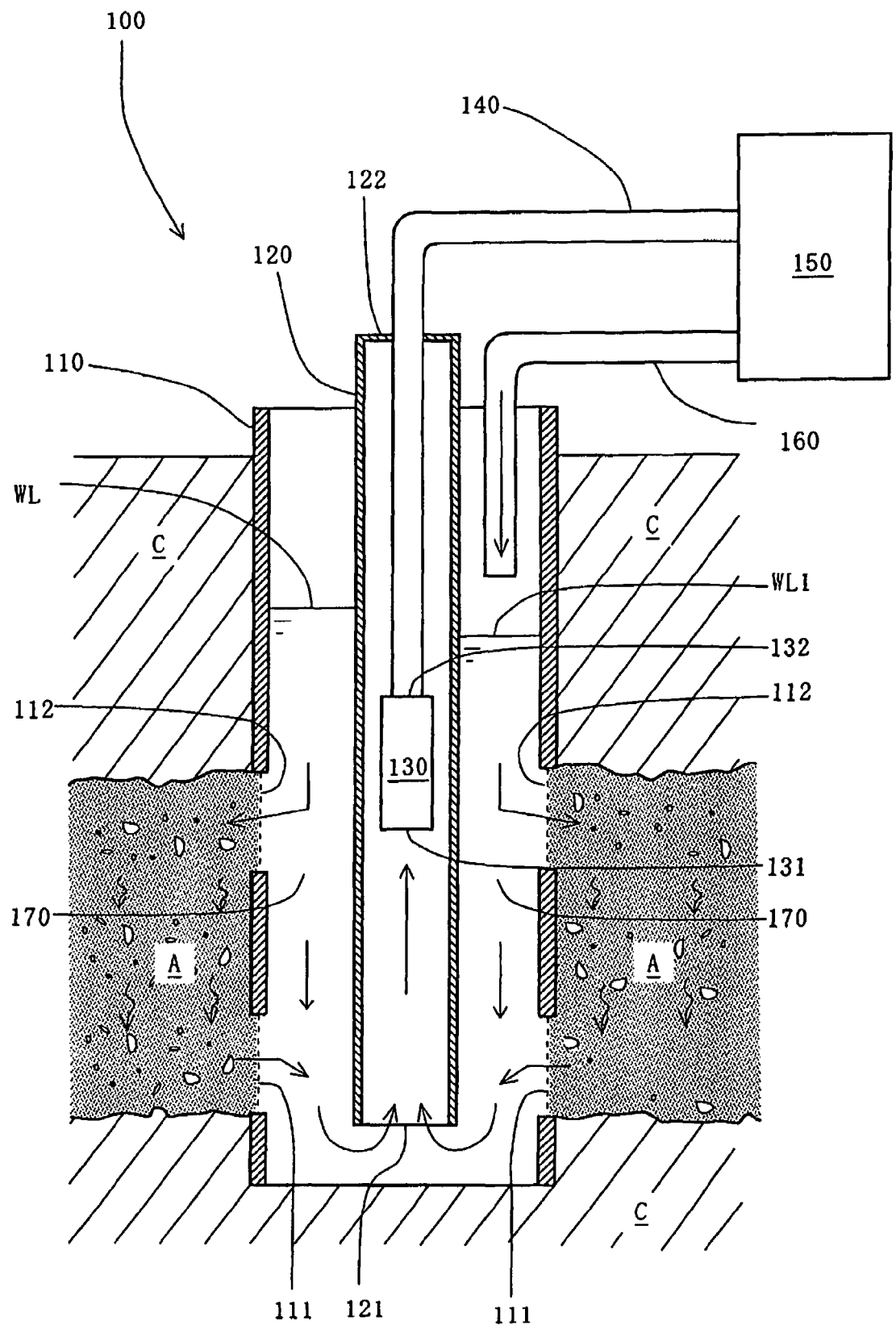
FIG. 1 is a block diagram showing a first embodiment of the double-pipe geothermal water circulating apparatus according to the present invention.

A preferred embodiment of the double-pipe geothermal water circulating apparatus according to the present invention will be described with reference to drawings. FIG. 1 is a block diagram of this first embodiment. In this first embodiment, geothermal water is mainly used as a heat source for exchanging the heat.

The ground in which the double-pipe geothermal water circulating apparatus 100 is installed underground includes geothermal water, an aquifer A composed of gravel and sand and an impermeable layer C such as clay layer.

The double-pipe geothermal water circulating apparatus 100 of the first embodiment essentially comprises an outer pipe 110 for collecting geothermal water in the aquifer A and returning used geothermal water to the aquifer A, a thermal insulation inner pipe 120 inserted adjacent to a lower end of the outer pipe 110 (bottom of a well) that delivers the geothermal water above the ground in a thermal insulation, a flow channel 170 formed between the thermal insulation inner pipe 120 and said outer pipe 110, a pump 130 for pumping the geothermal water from the thermal insulation inner pipe 120, a heat source supplying force feed pipe 140 for force-feeding the geothermal water pumped by the pump 130 to an heat exchanger 150 and a heat source reusing pipe 160 for delivering the geothermal water used in the heat exchanger 150 to the flow channel 170.

Here, each component of the first embodiment will be described in detail. The outer pipe 110 collects geothermal water from the aquifer A and stores it, and returns geothermal water used in heat exchanging to an upper part of the aquifer A. The outer pipe 110 is formed with a corrosion- and earthquake-proof material of a high thermal conductivity in a bottomless cylinder structure.

The outer pipe 110 is installed underground and is provided with strainers placed as deep as the aquifer A with a certain width. First of all, the outer pipe 110 is provided with a geothermal water supplying strainer 111 for feeding geothermal water to the outer pipe 110 adjacent to a lower end thereof, and a geothermal water returning strainer 112 for returning used geothermal water that is placed above the geothermal water supplying strainer 111 and at an upper part of the aquifer A apart from a lower end of the outer pipe 110. As in ordinary wells, the geothermal water supplying strainer 111 and geothermal water returning strainer 112 prevents gravel and sand from entering into the outer pipe 110. The positional relationship between the geothermal water supplying strainer 111 and geothermal water returning strainer 112 is determined according to the depth of the aquifer A for collecting the geothermal water and the amount of geothermal water retained in the aquifer A.

The thermal insulation inner pipe 120 delivers the geothermal water collected in the outer pipe 110 to the heat exchanger 150 in thermal isolation and forms a flow channel 170 for delivering used geothermal water to the geothermal water returning strainer 112 with the outer pipe 110. The thermal insulation inner pipe 120 is formed with a corrosion- and earthquake-proof thermal insulator in a bottomless cylinder structure. The outer diameter thereof is smaller than the internal diameter of the outer pipe 110, and the thermal insulation inner pipe 120 is inserted so that the flow channel 170 can be provided with a prescribed space with said outer pipe 110.

An upper end of the thermal insulation inner pipe 120 is capped with a top plate 122 for thermal insulation. On the other hand, a lower end of the thermal insulation inner pipe 120 is provided with an inlet 121 for infiltrating geothermal water, with it opened adjacent to a lower end of the outer pipe 110.

The flow channel 170 is formed between the outer pipe 110 and thermal insulation inner pipe 120, and there is no item for blocking the flow like a separating packer in a channel from the geothermal water returning strainer 112 through the geothermal water supplying strainer 111. As in the following descriptions, the channel is formed so that the geothermal water can directly flow into the inlet 121 from the heat source reusing pipe 160 to the thermal insulation inner pipe 120, even if the geothermal water strainer 111 and geothermal water returning strainer 112 are clogged.

The pump 130 serves as a source of power for pumping the geothermal water fed into the outer pipe 110 and force-feeding it to the heat exchanger 150. A suction part 131 of the pump 130 is installed below a running water level WL1 in the thermal insulation inner pipe 120. The pump 130 is also provided with a delivery part 132 for delivering pumped geothermal water with high pressure.

In this first embodiment, the pump 130 is a submerged pump suited to pumping in deep zone, thereby determining the position of the entire submerged pump below the running water level WL1. The running water level WL1 is a water level with which pumping machines like a pump are in operation, while a natural groundwater level WL is a water level with which water is collected in a natural process.

The heat source supplying force feed pipe 140 is a transport passage for force-feeding the geothermal water pumped by the pump 130 to the heat exchanger 150. It is formed with a corrosion- and earthquake-proof thermal insulator and is connected to the heat exchanger 150 so that it passes through the delivery part 132 of the pump 130 and the top plate 122 of the thermal insulation inner pipe 120.

The heat exchanger 150 is an appliance for extracting an heat exchanging heat source from pumped geothermal water. In the heat exchanger 150, geothermal water may be used in a heat exchanger (not shown) as a liquid medium or steamed medium therein. Then, the used geothermal water is collected in the heat exchanger.

The heat source reusing pipe 160 is a transport passage for returning used geothermal water used in the heat exchanger 150 as a heat source and collected from the geothermal water returning strainer 112 to the aquifer A. It is formed with a corrosion-proof material, and is connected to the heat exchanger 150 and flow channel 170.

Next, the operations of this first embodiment will be described.

In the double-pipe geothermal water circulating apparatus 100 of this first embodiment, geothermal water in the aquifer A is infiltrated from the geothermal water supplying strainer 111 into the outer pipe 110 by underground pressure.

Next, by operating the pump 130, the geothermal water taken in the outer pipe 110 is pumped from the inlet 121 of the thermal insulation inner pipe 120. Since the inlet 121 is installed adjacent to a lower end of the outer pipe 110, the geothermal water infiltrated from the geothermal water supplying strainer 111 can be swiftly fed into the thermal insulation inner pipe 120. The geothermal water is pumped with a constant temperature by thermal insulation effect of the thermal insulation inner pipe 120.

In the operation of the pump 130, the natural groundwater level WL declines to the running water level WL1. However, since the position of the entire pump 130 and the suction part 131 thereof are always determined below the running water level WL1, the reduction in suction force due to idling run is not observed.

The geothermal water pumped by the pump 130 is force-fed from the delivery part 132 to the heat exchanger 150 via the heat source supplying force feed pipe 140. After the geothermal water is used in the heat exchanger 150 as a heat source, it passes through the heat source reusing pipe 160 and flow channel 170, and then flows down in the flow channel 170.

The geothermal water flowing down in the flow channel 170 is divided in two parts. One part passes through the geothermal water returning strainer 112 to be reused in the aquifer A, and the other part flows down in the flow channel 170 to be mixed with geothermal water infiltrated from the geothermal water supplying strainer 111. The flow ratio of each geothermal water is affected by water pressure and the degree of clogging of the geothermal water returning strainer 112, and most of geothermal water is returned from the geothermal water returning strainer 112 to the aquifer A in an ordinary state.

On the other hand, geothermal water flowing down in the flow channel 170 is heated by geothermal heat on a wall of the outer pipe 110 and its temperature approaches the geothermal temperature. This geothermal water is favorably mixed with geothermal water infiltrated from the geothermal water supplying strainer 111.

In this process, if an imbalanced between the amount of geothermal water returned from the geothermal water returning strainer 122 to the aquifer A and the amount of geothermal water infiltrated from the geothermal water supplying strainer 111 is found, these amounts are adjusted in a natural process so that the running water level WL1 is maintained at an almost constant level, thereby achieving a stable supply of geothermal water as a heat source.

Figure 2:
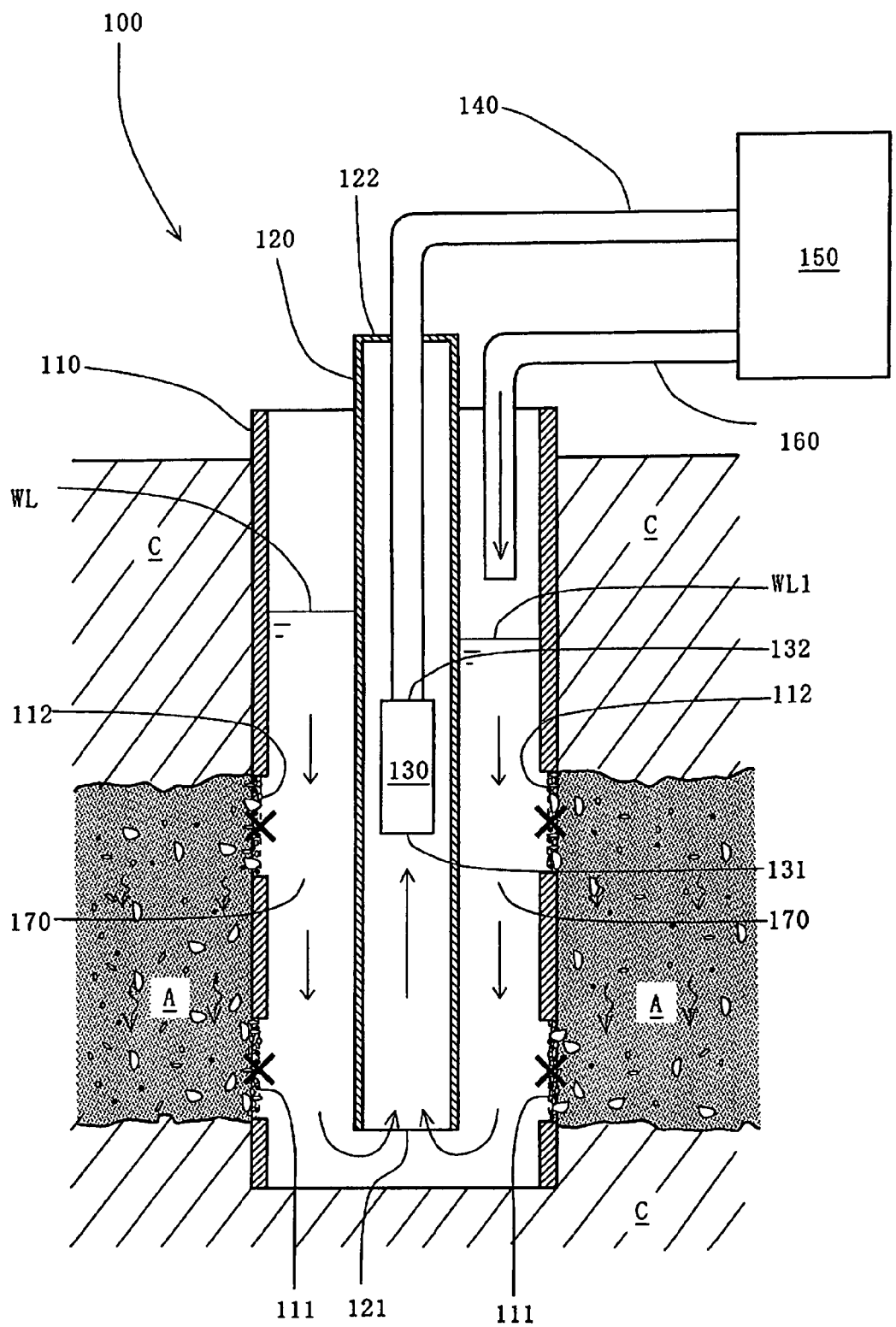
FIG. 2 is a block diagram showing the flow of geothermal water in clogged strainers of the first embodiment.
Figure 9:
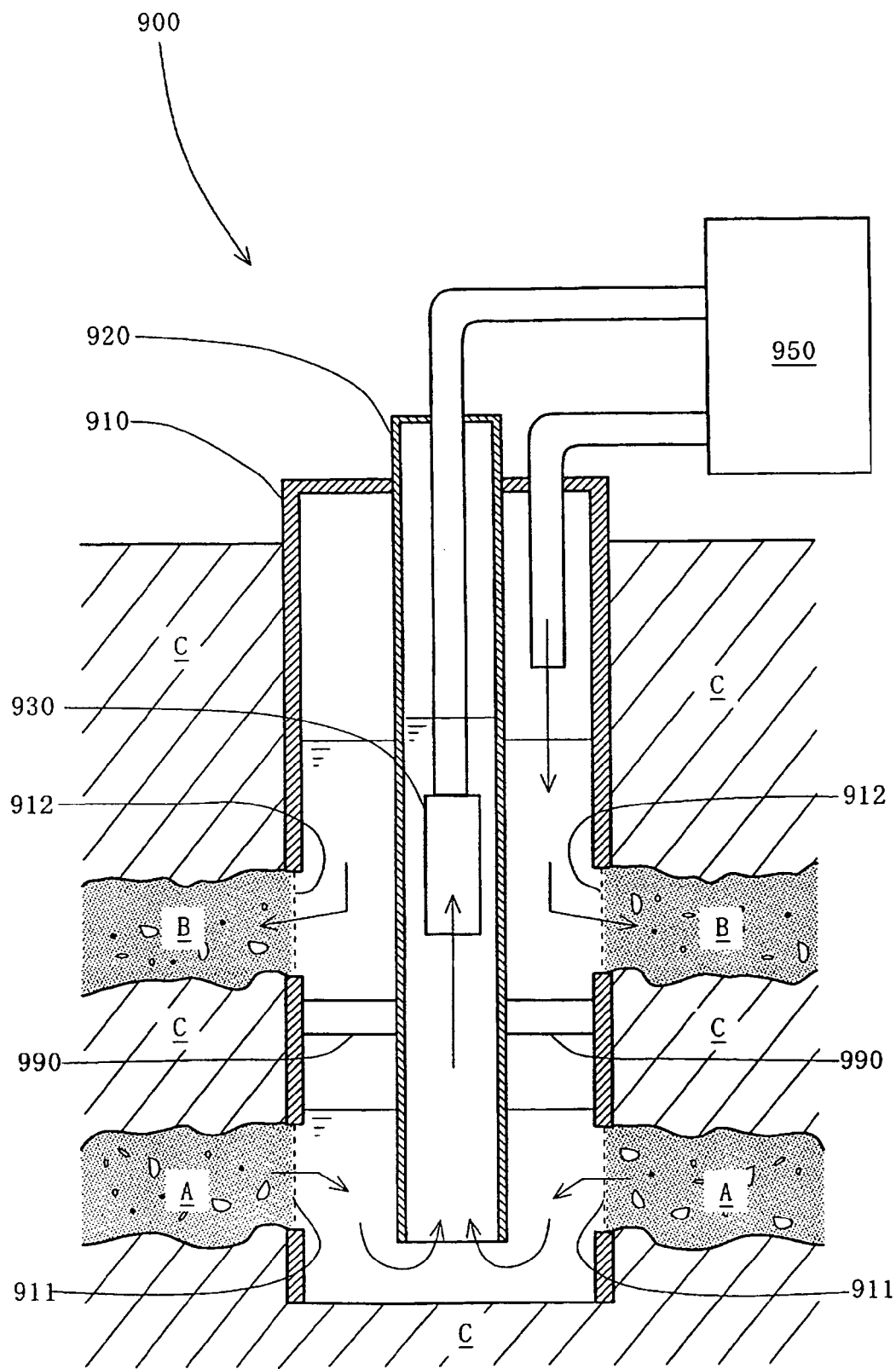
FIG. 9 is a block diagram showing a second embodiment of the underground geothermal water circulating apparatus according to claim 2 of the above Japanese Unexamined Patent Publication.

However, as shown in FIG. 2, a long-time use of this system can cause gradual clogging of the geothermal water supplying strainer 111 and geothermal water returning strainer 112. In this case, even if the geothermal water supplying strainer 111 is partially or completely clogged, the upper-located geothermal water returning strainer 112 can both supply and return the geothermal water. This structure can provide operational advantages due to no use of a separating packer, unlike in a conventional type of apparatus as shown in FIG. 9. If the geothermal water returning strainer 112 is also clogged, the conventional type of apparatus is unable to collect geothermal water or return it to the aquifer, resulting in the inability to use the system. However, since the flow channel 170 is not divided in the invention of this first embodiment, the collected geothermal water serves as a medium liquid despite clogged strainers. By infiltrating geothermal heat through an outer wall of the outer pipe 110, the geothermal water can be reused while it is cooled or heated, thereby achieving a continuous use as a heat source supplying appliance.

As described above, according to this first embodiment, used geothermal water can be reused as a heat source, because even if is returned to the aquifer A or flows down in the flow channel 170, it is cooled or heated by geothermal heat and the temperature of the mixture can be maintained at a prescribed level. Additionally, even an imbalance between the amount of the geothermal water collected from the aquifer A and the amount of geothermal water returned to the aquifer A is observed, the reused water volume is maintained constant in a natural process, thus preventing the exhaustion of water in a well due to excessive water intake and ground subsidence and achieving a stable supply of heat source. Even if the clogging of the geothermal water supplying strainer 111 and geothermal water returning strainer 112 is unable to collect and return the geothermal water, this apparatus can be continuously used by circulating the collected geothermal water in a closed pipe.

Next, a second embodiment of this invention will be described. The components of this second embodiment that are identical or equivalent those of the above-mentioned first embodiment are described using the same references used in the first embodiment.

Figure 3:
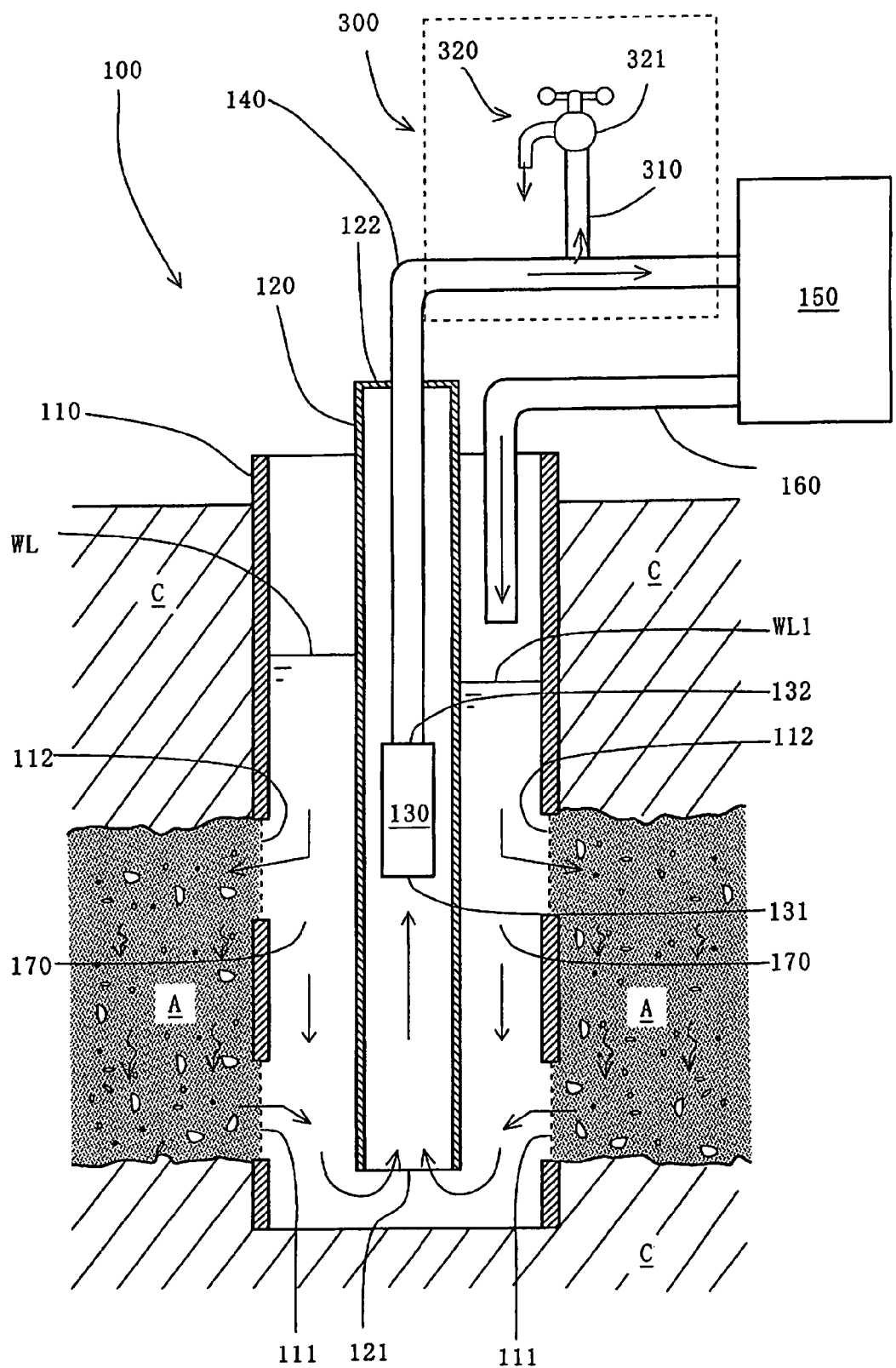
FIG. 3 is a block diagram showing a second embodiment of the double-pipe geothermal water circulating apparatus according to the present invention.

This second embodiment, as shown in FIG. 3, is characterized by the installation of water supplying and distributing means 300 on the heat source supplying force feed pipe 140. In this second embodiment, the double-pipe geothermal water circulating apparatus 100 uses hot water as a heat source and also as water source.

The water supplying and distributing means 300 comprises a branched pipe 310 branched from the heat source supplying force feed pipe 140 and an inlet 320 such as a faucet, and it divides and distributes part of geothermal water from the heat source supplying force feed pipe 140 to use pumped thermal water as a water source.

The branched pipe 310 is formed in a corrosion- and pressure-resistant circular pipe. The inlet 320 is provided with a valve part 321 like a faucet that is mounted at an end of the branched pipe 310 to control the consumption of geothermal water as a water source.

Next, the operations of this second embodiment will be described.

In this second embodiment, geothermal water is circulated in the double-pipe geothermal water circulating apparatus 100. Here, when the valve part 321 of the inlet 320 is opened, geothermal water in the heat source supplying force feed pipe 140 fed by the pump 130 is partially divided into the branched pipe 310 by the pressure and delivered from the inlet 320.

Accordingly, the amount of water circulating in the double-pipe geothermal water circulating apparatus 100 instantaneously declines. Unless the suction part 131 of the pump 130 comes above the running water level WL1, the geothermal water can be fed out of the double-pipe geothermal water circulating apparatus 100.

From these descriptions, geothermal water can be used as a heat source and also as a water source according to this second embodiment.

The double-pipe geothermal water circulating apparatus according to the present invention is not limited to the above-mentioned embodiments, but may be modified accordingly.

Figure 4:
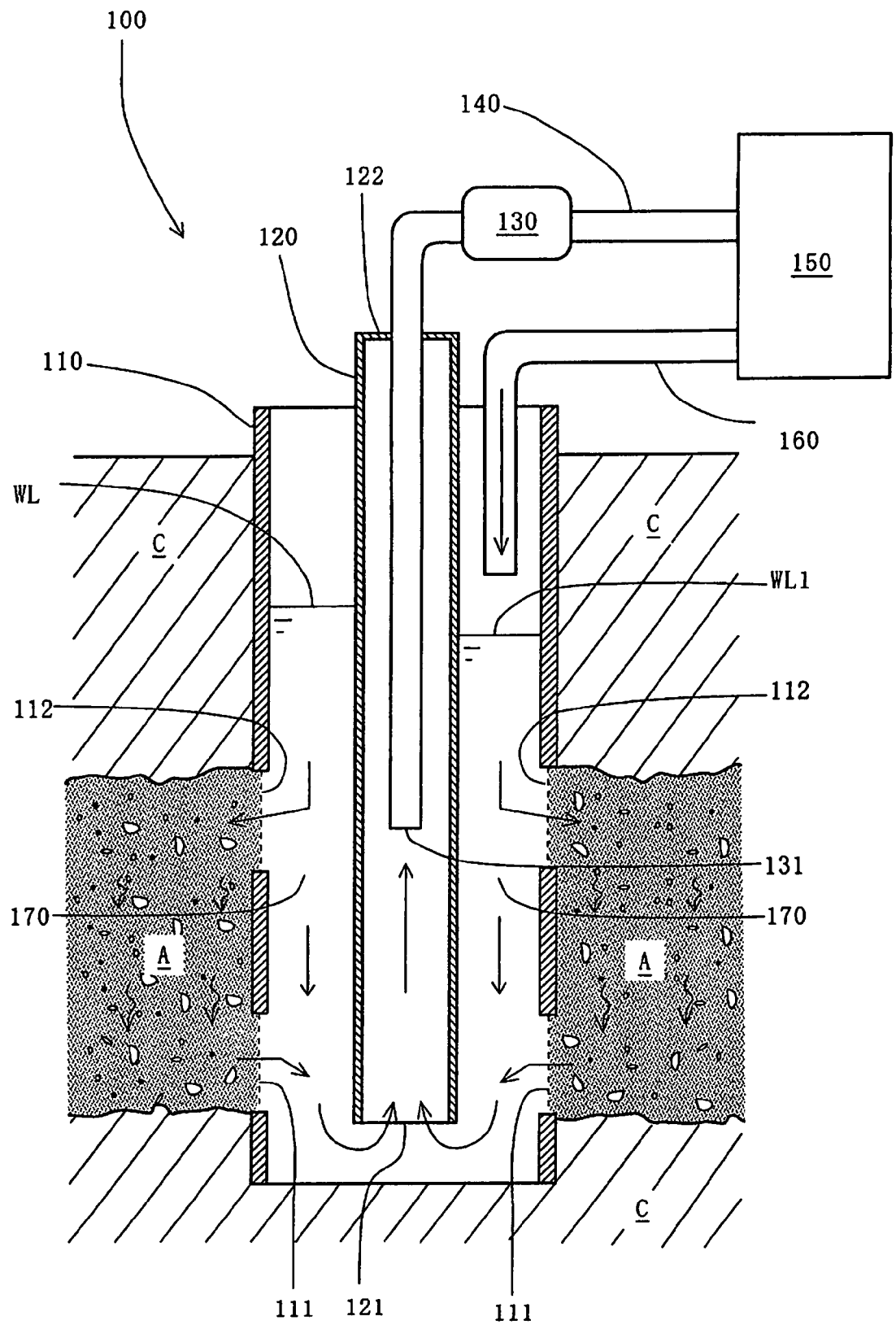
FIG. 4 is a block diagram showing an embodiment in the use of a well with a relatively low natural groundwater level or a flowing well.

For example, when a relatively shallow well with a natural groundwater level WL of 4 to 5 m or flowing well is used, the pump 130 may be of a smaller power. As shown in FIG. 4, if the suction part 131 is below the running water level, the pump 130 may be installed on the ground off the thermal insulation inner pipe 120.

Figure 5:
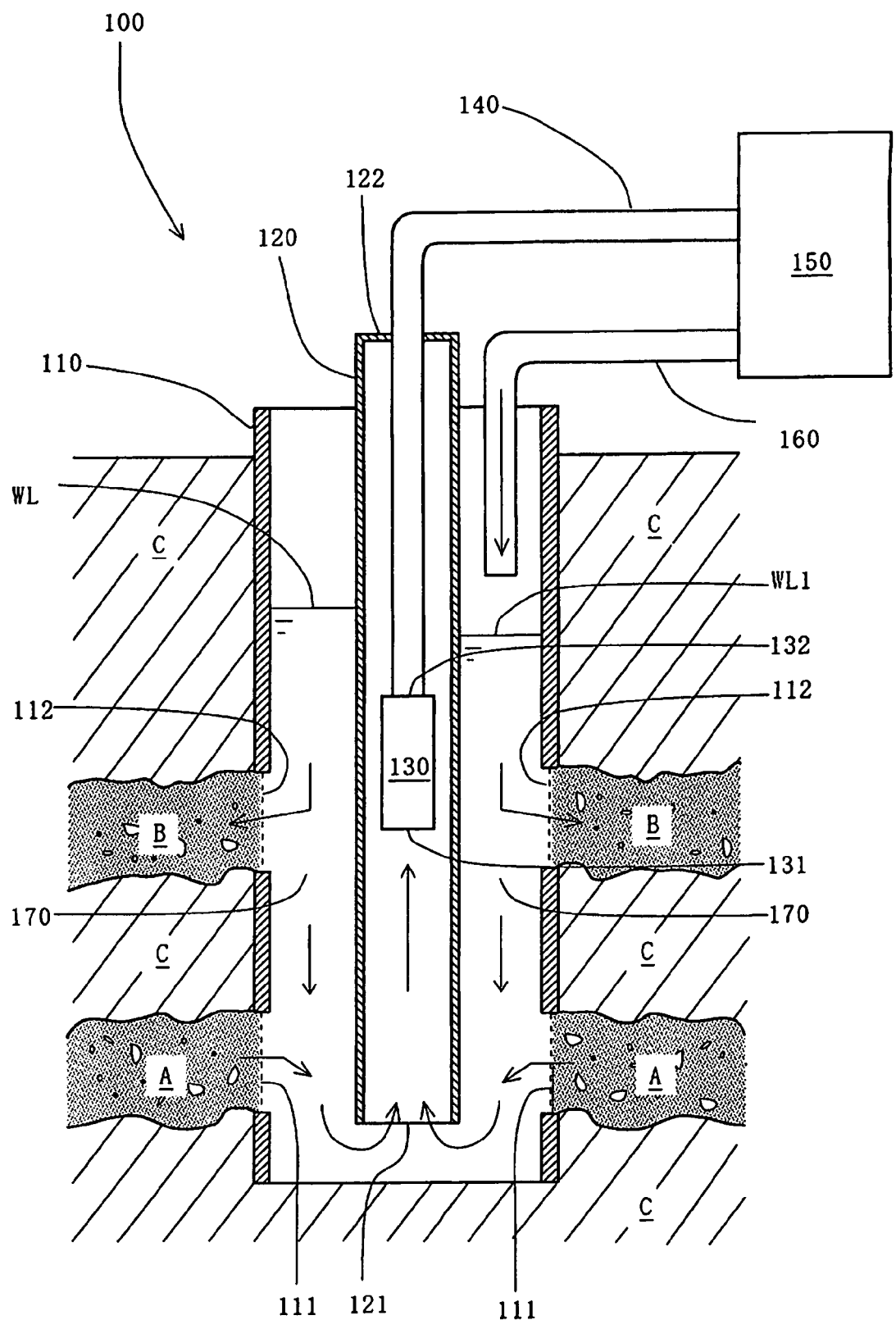
FIG. 5 is a block diagram showing an embodiment the double-pipe geothermal water circulating apparatus having 2-layered underground aquifers (upper and lower), in which an aquifer in contact with a geothermal water supplying strainer sufficiently retains geothermal water.

As shown in FIG. 5, when the aquifer is composed of 2-layered aquifers A and B (upper and lower) and the aquifer A sufficiently retains geothermal water, geothermal water may be infiltrated from the geothermal water supplying strainer 111 and used geothermal water may be returned from the upper-located geothermal water returning strainer 112 to the aquifer B.

Figure 6:
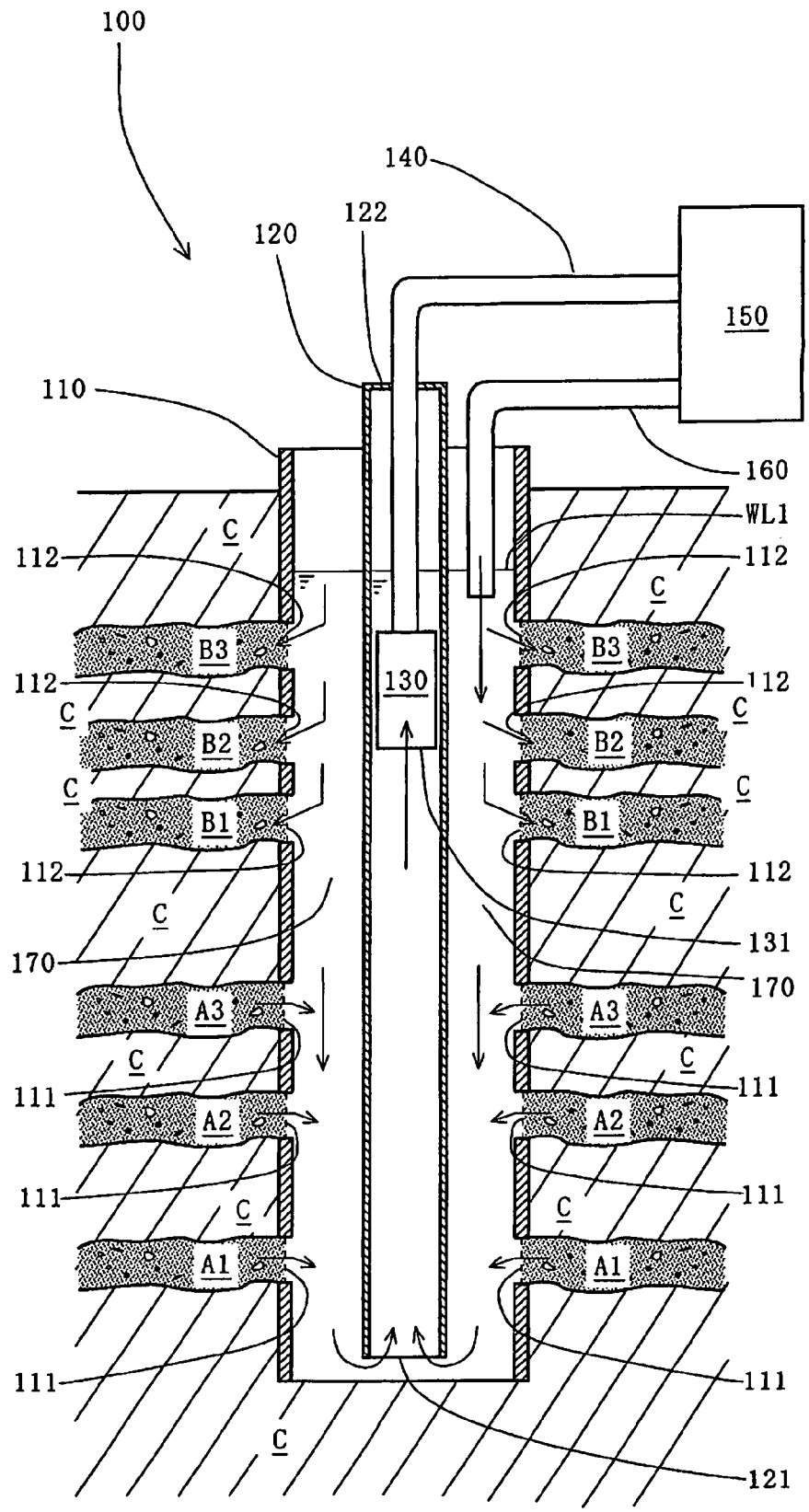
FIG. 6 is a block diagram showing an embodiment of the double-pipe geothermal water circulating apparatus having a plurality of underground aquifers.
Figure 7:
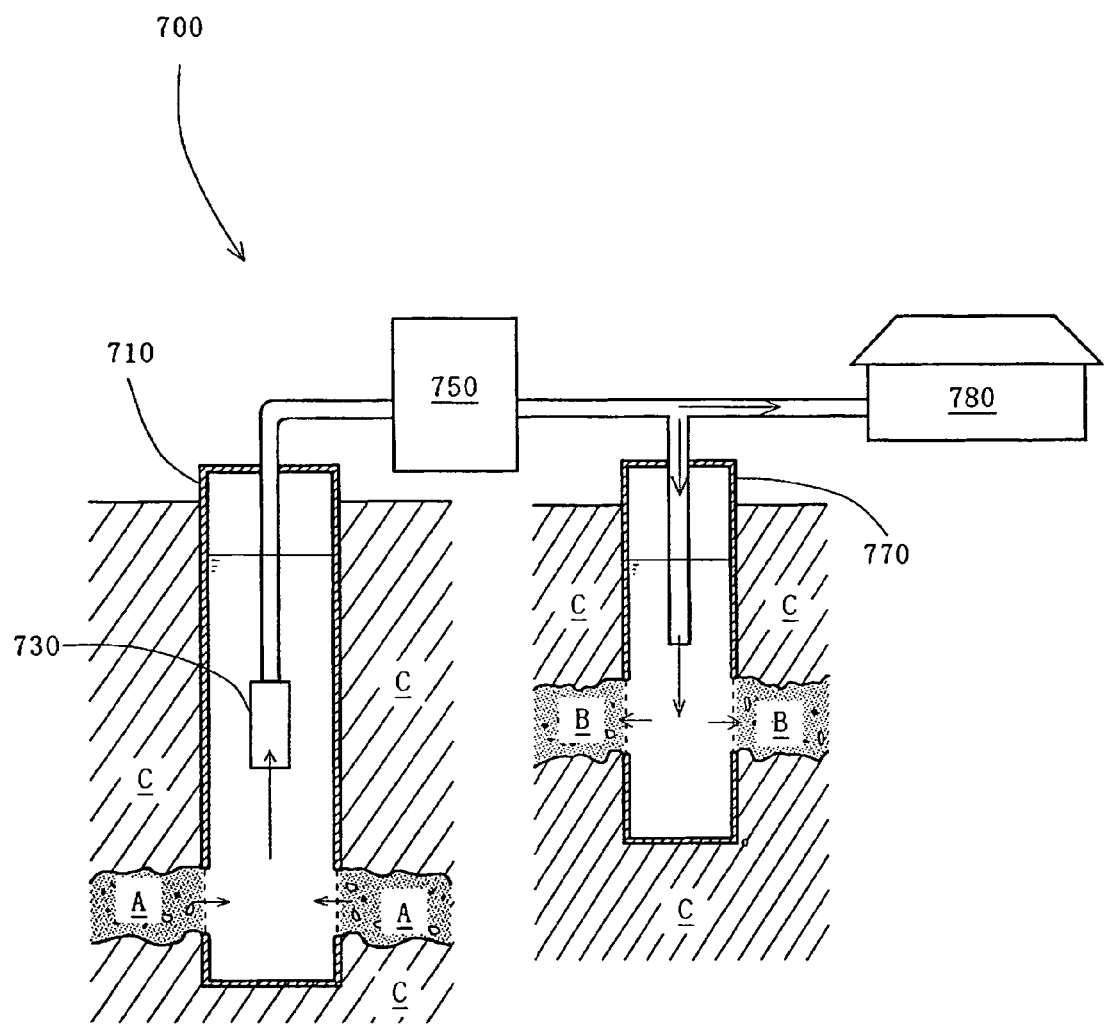
FIG. 7 is a diagram showing an example of conventional type of heat exchanging system using geothermal water.
Figure 8:
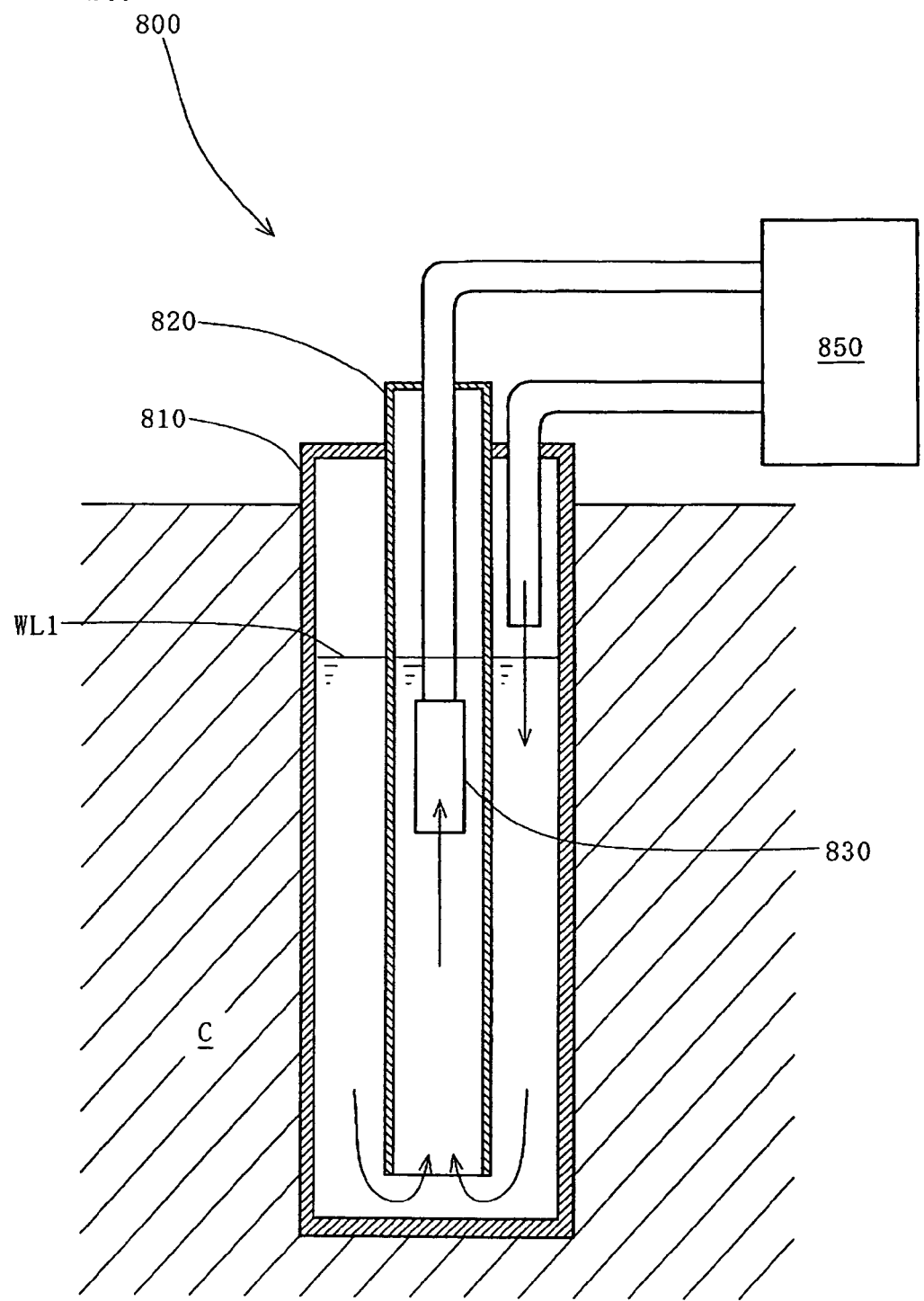
FIG. 8 is a block diagram showing a first embodiment of the underground geothermal water circulating apparatus according to claim 1 of the above Japanese Unexamined Patent Publication.

Additionally, if there are a plurality of aquifers as shown in FIG. 6, each aquifer may be provided with the geothermal water supplying strainer 111 or geothermal water returning strainer 112 accordingly.

As described above, even if there a plurality of aquifers, as described in the first embodiment, based on the degree of clogging of the geothermal water supplying strainer 111 and geothermal water returning strainer 112 in aquifers A1 to A3 and B1 to B3, each of the aquifers A1 to A3 and B1 to B3 can be used for supplying and returning geothermal water accordingly. Moreover, even if all of the strainers 111 and 112 are completely clogged, the apparatus can be operated as a circulating apparatus 100 closed in the pipe and continuously used in the long run.

What is claimed is:

1. A double-pipe geothermal water circulating apparatus for using geothermal water in an aquifer for exchanging the heat, comprising:

an outer pipe having a geothermal water supplying strainer that is installed as deep as said aquifer for collecting geothermal water from said aquifer and a geothermal water returning strainer for returning used geothermal water to said aquifer from above said geothermal water supplying strainer, a thermal insulation inner pipe composed of a thermal insulator inserted in said outer pipe that forms a flow channel with said outer pipe having an inlet for collecting said geothermal water adjacent to a lower end of said outer pipe, a pump for pumping said geothermal water having a suction part for sucking said geothermal water from said thermal insulation inner pipe installed below a running water level, a heat source supplying force feed pipe for force-feeding said geothermal water pumped by the pump to an heat exchanger, and a heat source reusing pipe connected to said flow channel for returning said geothermal water used in said heat exchanger to said aquifer, wherein;

said double-pipe geothermal water circulating apparatus is provided therein with said flow channel from said geothermal water returning strainer to said geothermal water supplying strainer that is not separated, whereby geothermal water can flow therethrough, and with said inlet for collecting geothermal water, by mixing geothermal water infiltrated from said geothermal water supplying strainer with part of geothermal water used in said heat exchanger.

2. The double-pipe geothermal water circulating apparatus set forth in claim 1, wherein: said heat source supplying force feed pipe is provided with water supplying and distributing means for using said geothermal water as a heat source and water source.

* * * * *